UNITED STATES PATENT OFFICE.

ISAAC BERNHARD, OF PARIS, FRANCE.

IMPROVEMENT IN LUBRICATING AND ANTI-INCRUSTATING COMPOUNDS.

Specification forming part of Letters Patent No. 185,886, dated January 2, 1877; application filed December 16, 1876.

*To all whom it may concern:*

Be it known that I, ISAAC BERNHARD, of Paris, France, have invented a Combined Lubricant and Anti-Incrustating Compound, which is fully set forth in the following description:

The object of my invention is to produce a compound which will have the double quality of serving as a lubricant and of preventing incrustation in steam-boilers; and this object I attain by a compound consisting of a mixture of saponaceous substance and potato or other starch, in about equal proportions, as described hereafter.

I first melt about one hundred parts of soap with five parts of gall, and after the mixture is melted I make a paste of one-hundred parts of the starch and ninety-five parts of gall. I then thoroughly mix the two substances together and heat them well. The mixture may be thickened with paste or sizing of any suitable kind. The starch-paste may be that which is ordinarily known as starch, or the starch of the potato, or any farinaceous substance. Instead of soap I may use saponaceous grease with equally good results.

When used as a lubricant the compound is found very efficient, especially when employed in connection with the parts of steam-engines, as slide-valves, cylinders, piston-valves, &c.

When used to prevent incrustation the compound may be employed either in a liquid form or in the form of tablets, which it is sufficient simply to place in the feed-tank. The compound not only prevents deposits of solid matter in heaters and boilers, but also disintegrates and dissolves deposits already formed, no matter what their thickness or how long they have been formed.

I claim as my invention—

The within-described compound, consisting of a mixture of soap, potato or other starch, or farinaceous substance, and gall, in about equal proportions, as set forth.

In testimony whereof I have signed my name to this specification in the presence of two subscribing witnesses.

ISAAC BERNHARD.

Witnesses:
 ALFRED COINY,
 EDOUARD BRIHIER.